(12) United States Patent
Mao et al.

(10) Patent No.: US 11,378,710 B2
(45) Date of Patent: Jul. 5, 2022

(54) FAULT DETECTION BASED ON SEISMIC DATA INTERPRETATION

(71) Applicant: Landmark Graphics Corporation, Houston, TX (US)

(72) Inventors: Youli Mao, Houston, TX (US); Bhaskar Mandapaka, Tomball, TX (US); Ashwani Dev, Katy, TX (US); Satyam Priyadarshy, Katy, TX (US)

(73) Assignee: Landmark Graphics Corporation, Houston, TX (US)

( * ) Notice: Subject to any disclaimer, the term of this patent is extended or adjusted under 35 U.S.C. 154(b) by 240 days.

(21) Appl. No.: 16/489,286

(22) PCT Filed: Jul. 18, 2018

(86) PCT No.: PCT/US2018/042642
§ 371 (c)(1),
(2) Date: Aug. 27, 2019

(87) PCT Pub. No.: WO2019/036144
PCT Pub. Date: Feb. 21, 2019

(65) Prior Publication Data
US 2020/0064507 A1     Feb. 27, 2020

Related U.S. Application Data

(60) Provisional application No. 62/547,648, filed on Aug. 18, 2017.

(51) Int. Cl.
*G01V 1/50* (2006.01)
*G06N 20/00* (2019.01)
(Continued)

(52) U.S. Cl.
CPC ............. *G01V 1/50* (2013.01); *G06K 9/6256* (2013.01); *G06K 9/6268* (2013.01); *G06N 3/08* (2013.01);
(Continued)

(58) Field of Classification Search
CPC ... G01V 1/50; G01V 1/28; G01V 1/30; G01V 1/301; G01V 2210/642; G01V 2210/646;
(Continued)

(56) References Cited

U.S. PATENT DOCUMENTS 5,724,309 A   3/1998  Higgs et al.
6,516,274 B2  2/2003  Cheng et al.
(Continued)

OTHER PUBLICATIONS

Canadian Application Serial No. 3063929; Non Final Office Action; dated Mar. 23, 2021, 5 pages.
(Continued)

*Primary Examiner* — Toan M Le
(74) *Attorney, Agent, or Firm* — Delizio, Peacock, Lewin & Guerra

(57) ABSTRACT

A method for determining a position of a geological feature in a formation includes acquiring a seismic dataset, wherein the seismic dataset is based on signals of one or more seismic sensors and determining a set of indicators of candidate discontinuities in the formation based on the seismic dataset. The method also includes labeling a subset of the set of indicators of candidate discontinuities using a neural network with a label based on the set of indicators of candidate discontinuities, wherein the label distinguishes an indicator of a candidate discontinuity between being an indicator of a target discontinuity or being an indicator of a non-target discontinuity and determining the position of the geological feature in the formation, wherein the geological feature in the formation is associated with at least one target discontinuity based on the subset of the set of indicators of candidate discontinuities.

20 Claims, 13 Drawing Sheets

(51) Int. Cl.
*G06K 9/62* (2022.01)
*G06N 3/08* (2006.01)

(52) U.S. Cl.
CPC ....... *G06N 20/00* (2019.01); *G01V 2210/642* (2013.01); *G01V 2210/646* (2013.01)

(58) Field of Classification Search
CPC ........ G06N 20/00; G06N 3/08; G06K 9/6256; G06K 9/6268
See application file for complete search history.

(56) References Cited

U.S. PATENT DOCUMENTS

| | | | |
|---|---|---|---|
| 9,105,075 | B1 | 8/2015 | Yu et al. |
| 2003/0179907 | A1 | 9/2003 | Bouts et al. |
| 2004/0267499 | A1* | 12/2004 | Barnes ................... G01V 1/288 702/179 |
| 2009/0310443 | A1 | 12/2009 | Lou et al. |
| 2010/0254219 | A1 | 10/2010 | Kumaran et al. |

OTHER PUBLICATIONS

PCT Application Serial No. PCT/US2018/042642, International Written Opinion, dated Oct. 17, 2018, 3 pages.
PCT Application Serial No. PCT/US2018/042642, International Written Opinion, dated Oct. 17, 2018, 5 pages.
FR Application Serial No. 1856617; First Office Action; dated Feb. 12, 2019, 3 pages.
FR Application Serial No. 1856617; Second Office Action; dated Feb. 12, 2019, 3 pages.
Jing, et al., "A Convolutional Neural Network Based Feature Learning and Fault Diagnosis Method for the Condition Monitoring of Gearbox", Measurement, Jul. 13, 2017, vol. III, pp. 1-10.

* cited by examiner

FAULT DETECTION BASED ON SEISMIC DATA INTERPRETATION

BACKGROUND

The disclosure generally relates to the field of subsurface fault detection, and more particularly to subsurface fault detection based on seismic data interpretation.

Interpretation of seismic data enhances understanding of subsurface geological features in a formation (e.g., faults, fractures, groups of fractures, porous regions, etc.). These seismic interpretations can provide the position and shape of these subsurface geological features. The position and shape of these subsurface geological features are useful to optimizing hydrocarbon production during drilling and stimulation treatments. For example, drilling location, various drilling parameters, production parameters, drilling project characterization and ranking, etc. can be determined based on knowledge of the position and shape of these subsurface geological features. Increasing the accuracy and speed of seismic interpretation through the use of fault interpretation algorithms increases the efficiency, economy, and safety of drilling and stimulation operations.

The complexity of seismic data results in fault interpretation workflows that include several operations which involve significant manual effort and/or a substantial number of parameters. Moreover, each operation can involve a significant amount of human input, such as testing many different parameters in these algorithms to determine their effects, classifying several types of detected features, and verifying that an algorithm is accurate during post-processing. These factors can increase the time and computing cost of performing a seismic interpretation and reduce the accuracy of the resulting interpretations.

BRIEF DESCRIPTION OF THE DRAWINGS

Embodiments of the disclosure can be better understood by referencing the accompanying drawings.

DESCRIPTION

Figure 1:
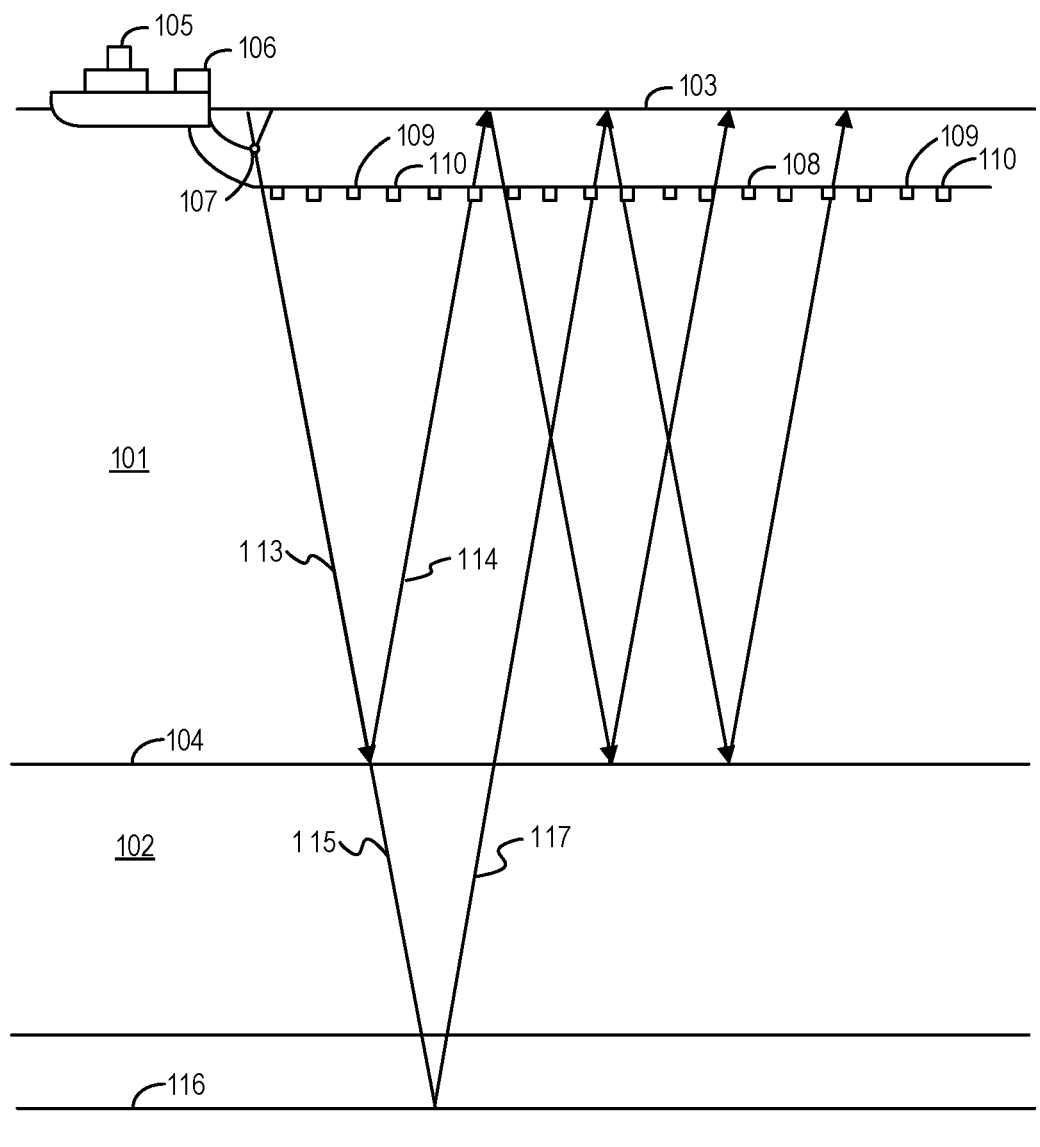
FIG. 1 depicts a schematic diagram of an elevation view of a typical marine seismic survey that can be used to provide seismic data.

The description that follows includes example systems, methods, techniques, and program flows that embody embodiments of the disclosure. However, it is understood that this disclosure can be practiced without these specific details. For instance, this disclosure refers to convolutional neural networks. Aspects of this disclosure can be instead applied to other machine-learning operations, such as traditional neural networks, backpropagation neural networks, and recurrent neural networks. In other instances, well-known instruction instances, protocols, structures and techniques have not been shown in detail in order not to obfuscate the description.

Various embodiments relate to an automated fault interpretation system that provides seismic interpretations. The automated fault interpretation system can be based on a deep learning fault interpretation method that can include a deep learning based classification algorithm to identify geological features such as geological faults ("faults") from seismic volumes based on a set of edge-detected datasets. The methods allow the automated processing of ever-larger volumes of seismic data with greater efficiency and accuracy.

In some embodiments, the deep learning fault interpretation method includes an edge detection method and a neural network method. After converting wave-based seismic datasets to a spatially digitized dataset such as a pixel-based dataset, the spatially digitized dataset is processed with an edge detection method to generate an edge-detected dataset. The edge detection method can determine a set of indicators of candidate discontinuities in a formation from the spatially digitized dataset and incorporate this set of indicators of candidate discontinuities into the edge-detected dataset. An indicator of a feature (e.g. a candidate discontinuity) is a representation of the feature (e.g. a data object, an array of values, set of functions, combinations thereof, etc.) and can be included in a dataset. For example, an indicator of a discontinuity can be a data object having a set of pixel values that correspond with the discontinuity and include information about the discontinuity such as its position, size, and/or shape. Determining a set of indicators of candidate discontinuities includes determining an indicator corresponding with its respective candidate discontinuity at least one of a position, shape, and orientation of each candidate discontinuity in the respective set of candidate discontinuities. Candidate discontinuities can include actual discontinuities in a formation (i.e. physical separations in materials or formation layers) such as faults and fractures. These faults and/or fractures can be target discontinuities of interest. Candidate discontinuities can also include features such as signal reflectors. Signal reflectors can be candidate discontinuities and incorporated into the edge-detected dataset by an edge-detection algorithm when the signal reflectors have strong discontinuity signals. A neural network and/or deep neural network (i.e. a neural network with multiple layers between an input and output) can be applied on the edge-detected dataset to perform fault likelihood labeling.

Fault likelihood labeling can include labeling a subset of indicators of discontinuities from the set of indicators of candidate discontinuities of the edge-detected dataset to filter out non-targeted discontinuities and keep target discontinuities such as faults and fractures to generate a filtered, edge-detected dataset. Non-targeted discontinuities can be defined as any discontinuity that is not a target discontinuity and can change depending on what is selected as a target discontinuity. For example, a signal reflector can be a non-targeted discontinuity if the signal reflector is not a target discontinuity. The label can distinguish a candidate discontinuity as being a target discontinuity or not being a target discontinuity. The deep learning fault interpretation method can be applied on any number of seismic datasets to provide seismic interpretation results that efficiently and accurately reveal geological features such as fractures and faults. In some cases, a neural network can be used to detect alternative target features such as imaging artifacts (e.g. reflectors and signal outliers) and include these alternative target features in a seismic interpretation result. In some embodiments, these seismic interpretation results can be performed in real-time or briefly after acquisition of a seismic dataset (e.g. within ten minutes of measuring or acquiring a seismic dataset to interpret).

In some embodiments, the seismic interpretation results can be used to determine a position of a geological feature associated with one of the target discontinuities based on the labeled subset of indicators of discontinuities in the seismic interpretation results. These positions can be used to plan drilling direction or well stimulation treatments. For example, the positions of faults can be used to determine a drilling plan to ensure that drilling does not drill into a fault. In some embodiments, the position of the fault can be incorporated into a drilling control system to automatically prevent a drill from drilling near a boundary close to the fault plane. Additionally, the position of faults can determine the parameters of a stimulation treatment so that stimulation would not damage or perforate geological media in the vicinity of a fault.

EXAMPLE SEISMIC DATA ACQUISITION SYSTEM

FIG. 1 depicts a schematic diagram of an elevation view of a typical marine seismic survey that can be used to provide seismic data. A body of water 101 over the earth 102 is bounded at a water surface 103 by a water-air interface and at a water bottom 104 by a water-earth interface. Beneath the water bottom 104, the earth 102 contains subterranean formations of interest. A seismic vessel 105 travels on the water surface 103 and contains seismic acquisition control equipment 106. The seismic acquisition control equipment 106 includes navigation control, seismic source control, seismic sensor control, and recording equipment.

The seismic acquisition control equipment 106 causes a seismic source 107 towed in the body of water 101 by a seismic vessel 105 to actuate at selected times. Seismic streamers 108 contain sensors to detect the reflected waves initiated by the seismic source 107 and reflected from interfaces in the environment. The seismic streamers 108 can contain pressure sensors such as hydrophones 109 and/or water particle motion sensors such as geophones 110. The hydrophones 109 and geophones 110 are typically co-located in pairs or pairs of sensor arrays at regular intervals along the seismic streamers 108.

The seismic source 107 is activated at periodic intervals to emit acoustic waves in the vicinity of the seismic streamers 108 with the hydrophones 109 and the geophones 110. Each time the seismic source 107 is actuated, an acoustic wave travels upwardly or downwardly in spherically expanding wave fronts. The traveling waves will be illustrated by ray paths normal to the expanding wave fronts. The downwardly traveling wave from the seismic source 107 traveling along a ray path 113 will reflect off the earth-water interface at the water bottom 104 and then travel upwardly along ray path 114, where the wave can be detected by the hydrophones 109 and geophones 110. Such a reflection at the water bottom 104, as in ray path 114, contains information about the water bottom 104 and hence can be retained for further processing. Additionally, the downwardly traveling wave traveling along ray path 113 can transmit through the water bottom 104 and travel along ray path 115 before reflecting off a layer boundary 116. This wave can then travel upwardly along ray path 117 and be detected by the hydrophones 109 and geophones 110. Such a reflection off the layer boundary 116 can contain useful information about subterranean formations of interest that can be used to generate seismic data.

Figure 2:
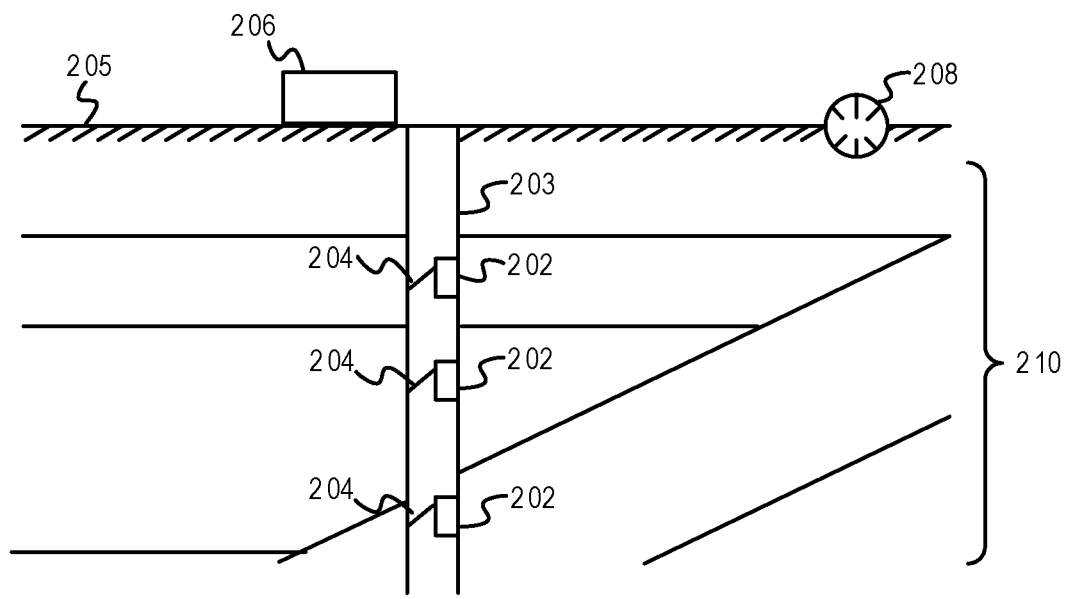
FIG. 2 depicts a schematic diagram of an onshore borehole seismic survey environment.

FIG. 2 depicts a schematic diagram of an onshore borehole seismic survey environment. Seismic receivers 202 are in a spaced-apart arrangement within a borehole 203 to detect seismic waves. As shown, the seismic receivers 202 can be fixed in place by anchors 204 to facilitate sensing seismic waves. In different embodiments, the seismic receivers 202 can be part of a logging-while-drilling (LWD) tool string or wireline logging tool string. Further, the seismic receivers 202 communicate wirelessly or via cable to a data acquisition unit 206 at a surface 205, where the data acquisition unit 206 receives, processes, and stores seismic signal data collected by the seismic receivers 202. To generate seismic signal data, surveyors trigger a seismic source 208 at one or more positions to generate seismic energy waves that propagate through a formation 210. Such waves reflect from acoustic impedance discontinuities to reach the seismic receivers 202. Illustrative discontinuities include faults, boundaries between formation beds, and boundaries between formation fluids. The discontinuities can appear as bright spots in the subsurface structure representation that is derived from the seismic signal data. The collected seismic signal data can be used to generate a seismic dataset.

EXAMPLE OPERATIONS

Figure 3:
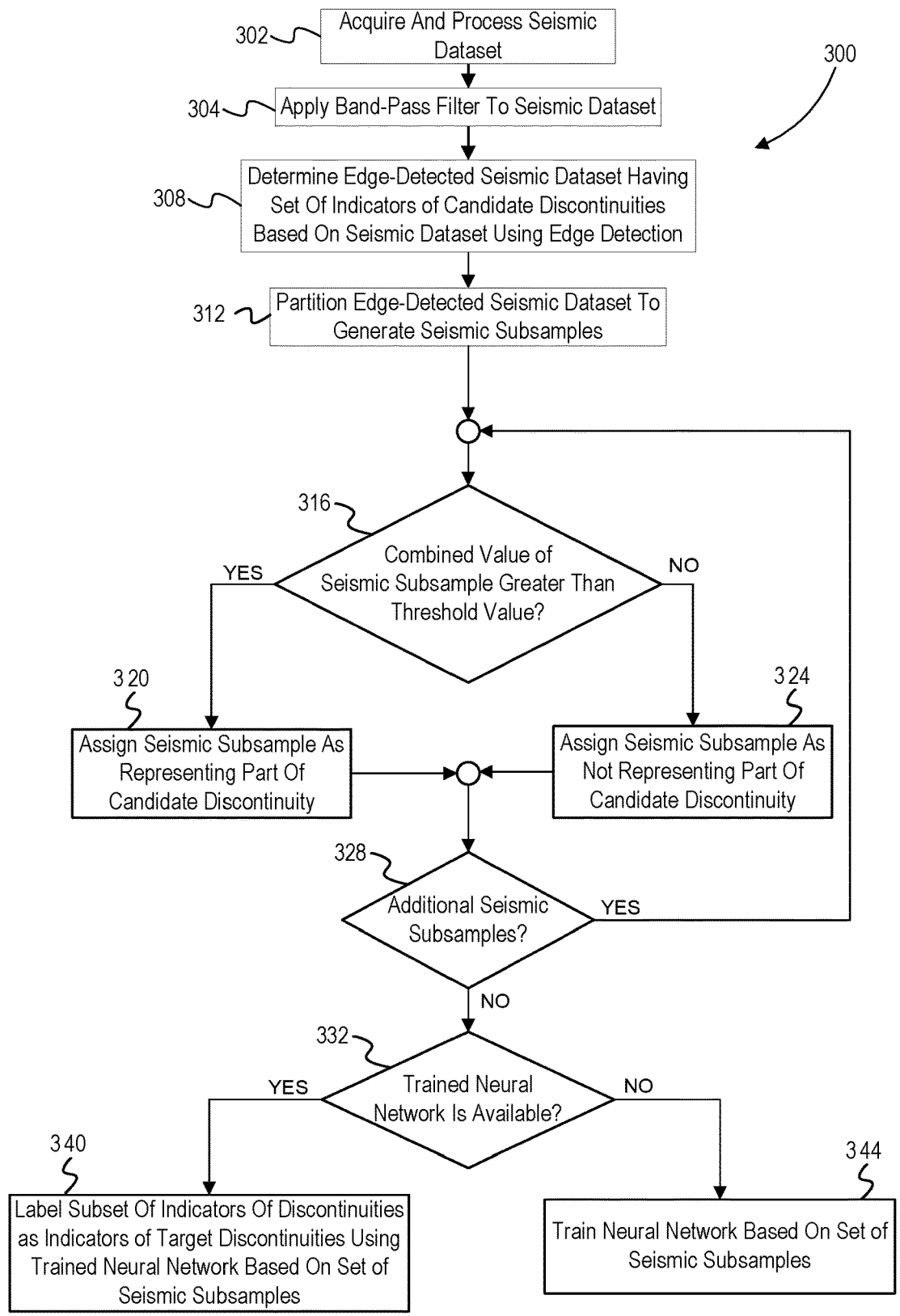
FIG. 3 depicts a flowchart of operations to generate an interpreted seismic volume.

FIG. 3 depicts a flowchart of operations to generate an interpreted seismic volume. Operations of the flowchart 300 begin at block 302. Operations of the flowchart 300 can be performed with by a system comprising a processor.

At block 302, a seismic dataset is acquired and processed. The seismic dataset can be a multi-dimensional dataset based on signals/values of seismic sensors that can receive waves generated from a source (e.g., seismic source 107 from FIG. 1 or seismic source 208 from FIG. 2) and reflected from within a formation. In some embodiments, the seismic datasets can be processed to convert the dataset from a set of seismic reflection data, such as a "SEGY" data format, into a spatially digitized data format such as a pixel-based data format. For example, the seismic dataset can be initially received as a set of amplitude values of each of a set of two-dimensional seismic cross-sections (e.g. inline cross-sections and crossline cross-sections that can be stacked to form a formation volume). The seismic dataset can be processed by using a bijective mapping. In this process, a bijective mapping is built between each of the set of amplitude values and a pixel value in an image. Alternatively, some embodiments can include converting an initial seismic dataset into a three-dimensional spatially digitized dataset such as a three-dimensional voxel-based dataset.

At block 304, a band-pass filter is applied to the seismic dataset. Some candidate discontinuity capture (i.e. capture of signals used to determine indicators of candidate discontinuities as indicators) can be optimized using signals at a particular frequency. For example, certain candidate discontinuities in a seismic dataset can be captured more accurately by high frequency signals. A set of bandpass filters can be applied to the collected seismic signals to isolate or capture greater detail on candidate discontinuities such as fractures and faults. For example, a set of bandpass filters including a low bandpass filter with a frequency of 5-10 Hz and a high bandpass filter with a frequency of 50-70 Hz can be applied to the collected seismic dataset(s). Use of a low bandpass filter with a frequency of 5-10 Hz on a seismic dataset can provide better candidate discontinuity capture of larger candidate discontinuities. Use of a high bandpass filter with a frequency of 50-70 Hz on a seismic dataset can provide better candidate discontinuity capture for smaller candidate discontinuities.

At block 308, an edge-detected seismic dataset having a set of indicators of candidate discontinuities is determined based on the seismic dataset using edge detection. The edge detection can include the application of a phase congruency operation on the seismic dataset. For example, a pixel-based phase congruency operation can identify corners and edges from pixel images. These identified corners and edges are useful for detecting features such as candidate discontinuities and determining the indicators of the candidate discontinuities. In addition, the phase congruency operation can also capture reflectors, which can have a clear edge, and determine indicators of these reflectors. In some embodiments, the phase congruency operation can filter out continuous events such as structural and stratigraphic features in the seismic data. In some embodiments, the phase congruency operation can determine a set of indicators of candidate discontinuities that could be missed by other discontinuity detection methods such as machine learning-based discontinuity detection algorithms. Alternatively, for three-dimensional voxel-based seismic datasets, other edge-detection methods can be used to detect candidate discontinuities in a three-dimensional model of the formation. For example, an edge detection method can include comparing the n-nearest neighboring values of a voxel to determine if the voxel is at an edge or not at an edge.

At block 312, seismic subsamples are generated by partitioning the edge-detected seismic dataset. The size of a seismic dataset, such as a seismic volume or image, can be significant and cost an inordinate amount of time or computing resources to properly train in a neural network. Thus, an operation can partition an edge-detected seismic dataset into seismic subsamples to more efficiently train a neural network to perform fault likelihood labeling. For example, an operation can partition an edge-detected seismic dataset into seismic subsamples, each seismic subsample including a 5×5 pixel image along with any corresponding pre-calculated labels. In alternative embodiments, the dimensions of the labeling array can have any arbitrary dimensions, such as 2 pixels by 4 pixels, 10 pixels by 10 pixels, or 30 pixels by 20 pixels. In alternative three-dimensional embodiments, such as ones wherein the seismic dataset is formed from three-dimensional voxels, a labeling array can also have three dimensions. For example, the labeling array can have any arbitrarily-sized dimensions smaller than the size of a full seismic dataset, such as 2×2×2 pixels, 3×3×2 pixels, or 10×20×25 pixels.

At block 316, a determination is made of whether a combined value of a seismic subsample is greater than a threshold value. The determination can be made as part of a binary classification operation (i.e. operation that labels/classifies a feature into one of only two categories) in order to increase efficiency in a neural network filter. In some embodiments, a combined value for an entire subsampled volume or image can be assigned based on all the labels/values of its constituent indicator elements. For example, a seismic subsample can include a 5×5 pixel array and can have a corresponding 5×5 subsample labeling array, wherein each element of the 5×5 subsample labeling array has a value between zero and one to represent the likelihood of a pixel corresponding with the labeling element actually representing a part of a candidate discontinuity. The combined value of the seismic subsample can be the arithmetic mean of each of the subsample labeling arrays. Alternatively, the combined value of the seismic subsample can be a weighted mean of the subsample labeling array, median value of the subsample labeling array, or random value drawn from one of the elements of the subsample labeling array. The combined value can then be compared to a threshold value such as 0.5 to determine if the combined value is greater than the threshold. In alternative embodiments, instead of determining whether a value is greater than or equal to a threshold, the criterion can be whether a value is less than or equal to a threshold. In the case that the combined is greater than the threshold value, operations of the flowchart 300 proceed to block 320. Otherwise, operations proceed to block 324.

At block 320, the seismic subsample is assigned as representing a part of a candidate discontinuity. Being assigned as representing a part of a candidate discontinuity can include explicitly changing a tag or identifier corresponding with the seismic subsample to reflect that the seismic subsample represents a part of a candidate discontinuity. For example, an array corresponding with the seismic subsamples can have an array value assigned to a particular seismic subsample be set to "0" to reflect that the seismic subsample is assigned as a candidate discontinuity. Alternatively, various tags, boolean values, or identifiers can be used to assign the seismic subsample as representing a part of a candidate discontinuity (e.g., a boolean value of "false," a string value of "discontinuity", etc.).

At block 324, the seismic subsample is assigned as not representing a part of a candidate discontinuity. Being assigned as not representing a part of the candidate discontinuity can include explicitly changing a tag or identifier corresponding with the seismic subsample to reflect that the seismic subsample is not representing a part of the candidate discontinuity. For example, an array of seismic subsamples can have the array value assigned to the seismic subsample be "1" to reflect that the seismic subsample is not a discontinuity. Alternatively, various tags, boolean values, or identifiers can be used to assign the seismic subsample as not representing a part of a discontinuity (e.g., a boolean value of "true," a string value of "not discontinuity", etc.).

At block 328, a determination is made of whether additional seismic subsamples are available. If so, operations of the flowchart 300 proceeds to the next available seismic subsample and returns to block 316. Otherwise, operations of the flowchart 300 proceeds to block 332.

At block 332, a determination is made of whether a trained neural network is available. If a trained neural network is available, operations of the flowchart 300 proceed to block 340. Otherwise, operations of the flowchart 300 proceed to block 344.

At block 340, a subset of the indicators of discontinuities are labeled as indicators of target discontinuities using the trained neural network based on the set of seismic subsamples. The trained neural network can be a deep neural network such as a convolutional neural network. Alternatively, the trained neural network can be another type of feedforward neural network such as a time delay neural network, radial basis function neural network, or recurrent neural network. The trained neural network can distinguish between target features (e.g. target discontinuities) and non-targeted features and label features accordingly. For example, the trained neural network can generate a labeled subset of indicators of discontinuities from a set of indicators of candidate discontinuities based on each of the labeled subset of indicators of discontinuities being identified as being one of the indicators of target discontinuities. In some embodiments, the indicators of target discontinuities can be a part of an interpreted seismic volume that includes representations of various geological features associated with the target discontinuities such as faults or fractures.

The indicator of the target discontinuity can be a part of an interpreted seismic volume. The interpreted seismic volume can include an array that associates one or more positions in a geological region corresponding to the seismic dataset with the target discontinuity or a geological feature associated with the target discontinuity. A geological feature associated with a target discontinuity can include the entirety of the target discontinuity, a specific section of the target discontinuity, a group of discontinuities including the target discontinuity, etc. The interpreted seismic volume can be de-noised to emphasize the position/orientation/shape of the target discontinuity or a geological feature associated with the target discontinuity. For example, a trained neural network can assign a "fracture/fault" or "not fracture/fault" label to each geological feature of a seismic dataset by assigning the label to each pixel of a two-dimensional dataset or each voxel of a three-dimensional dataset, and remove geological features not assigned as a fracture/fault from the interpreted seismic volume. With respect to FIG. 4, described further below, operations similar to or the same as those described for blocks 404-416 can provide the interpreted seismic volume having the target discontinuity.

At block 344, the neural network is trained based on the set of seismic sub samples. The neural network can be trained using either or both real seismic datasets or synthetic/generated seismic datasets. In some embodiments, training datasets can be based on manual interpretation of seismic data with fractures/faults labeled by human domain experts. In some embodiments, training datasets can include software-generated datasets and be based on fault likelihood algorithms such as a semblance-based algorithm. In some embodiments, the neural network can be a supervised learning approach based on labeled training datasets.

Figure 4:
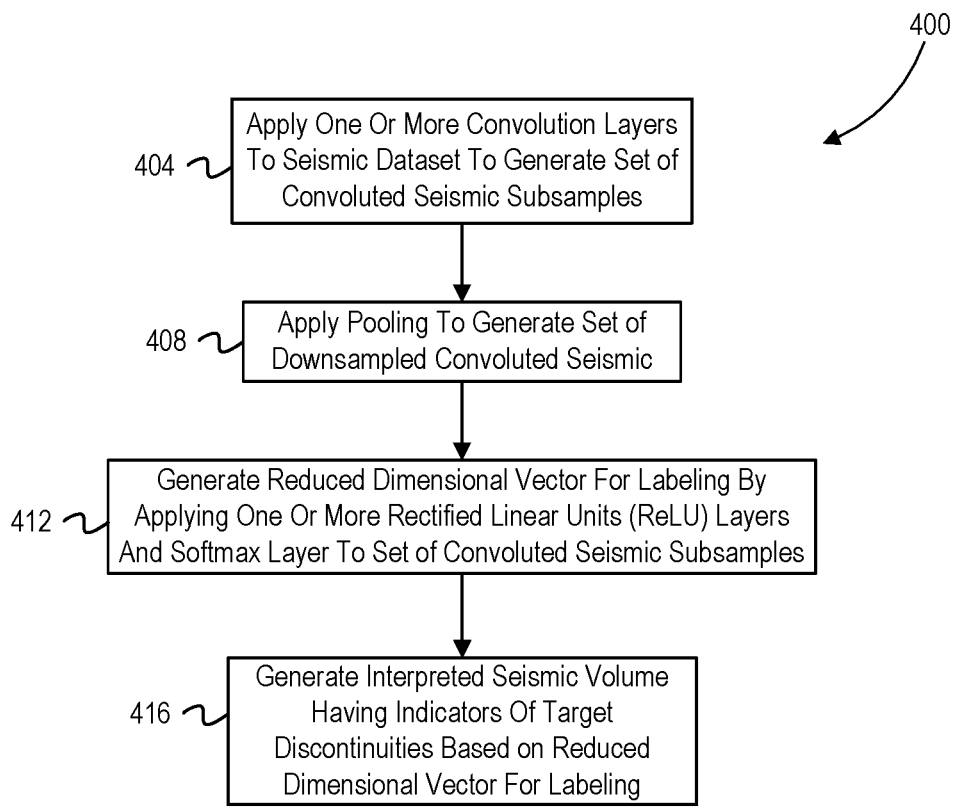
FIG. 4 depicts a flowchart of operations to use a convolutional neural network generate an interpreted seismic volume.

FIG. 4 depicts a flowchart of operations to use a convolutional neural network generate an interpreted seismic volume. Operations of the flowchart 400 begin at block 404. Operations of the flowchart 400 can be performed using a system comprising a processor. While the system can perform operations of the flowchart 400 before edge-detection of the seismic dataset, the system can also perform operations of the flowchart 400 after edge-detection of the seismic dataset.

At block 404, one or more convolution layers are applied to a seismic dataset to generate a set of convoluted seismic subsamples. The seismic dataset can be an edge-detected seismic dataset having a set of indicators of candidate discontinuities before application of the one or more convolution layers. Alternatively, the seismic dataset can be directly processed by the one or more convolution layers before an edge-detection operation occurs. Applying a convolution layer includes applying one or more convolutional filters to each of the set of seismic subsamples. Applying the one or more convolutional filters to each of the set of seismic subsamples can include determining a dot product result between the one or more convolutional filters and each respective seismic subsample of the set of seismic subsamples.

At block 408, the system applies pooling to generate a set of downsampled convoluted seismic data. Once one or more convolution layers have been applied, the system can pool the set of convoluted seismic subsamples to increase the efficiency of other operations of the convolutional neural network. Benefits of pooling a dataset can include reducing the spatial size of representation and control overfitting.

At block 412, a reduced dimensional vector for labeling is generated by applying one or more Rectified Linear Units (ReLU) Layers and fully connected layers to the set of convoluted seismic subsamples. In some embodiments, use of a unit of a ReLU layer can include the use of various activation functions such as a non-saturating activation function $f(x)=\max(0, x)$. Alternatively, a unit of a ReLU layer can include a saturating hyperbolic tangent function, sigmoid function, or other nonlinear function. After application of the ReLU layers, use of one or more fully connected layers can provide a reduced dimensional vector for labeling an indicator of a target discontinuity from a set of indicators of candidate discontinuities. Additional layers, such as a final layer of softmax units can be used to contribute to/improve the reduced dimensional vector for labeling indicators of target discontinuities. For example, application of ReLU layers and a softmax units layer onto a set of convoluted seismic subsamples can provide a reduced dimensional vector used to label indicators of faults in a geological formation and distinguish the indicators of faults from indicators of reflectors in the geological formation.

At block 416, an interpreted seismic volume having the indicators of target discontinuities is generated based on the reduced dimensional vector for labeling. Utilization of the reduced dimensional vector can generate a labeled subset of indicators of discontinuities by applying the reduced dimensional vector to the set of indicators of candidate discontinuities. A system can combine the seismic dataset with the indicators of target discontinuities to generate an interpreted seismic volume. The interpreted seismic volume can provide a physical position of one or more target discontinuities in the geological formation, which can be used to plan drilling operations, well treatment operations, etc. For example, the interpreted seismic volume can include information on the physical position of a fault in a geological formation with respect to a drill bit in the geological formation. This information can then be used to stop drilling activity when the drill bit is within a threshold distance from the fault.

EXAMPLE DATA

Figure 5:
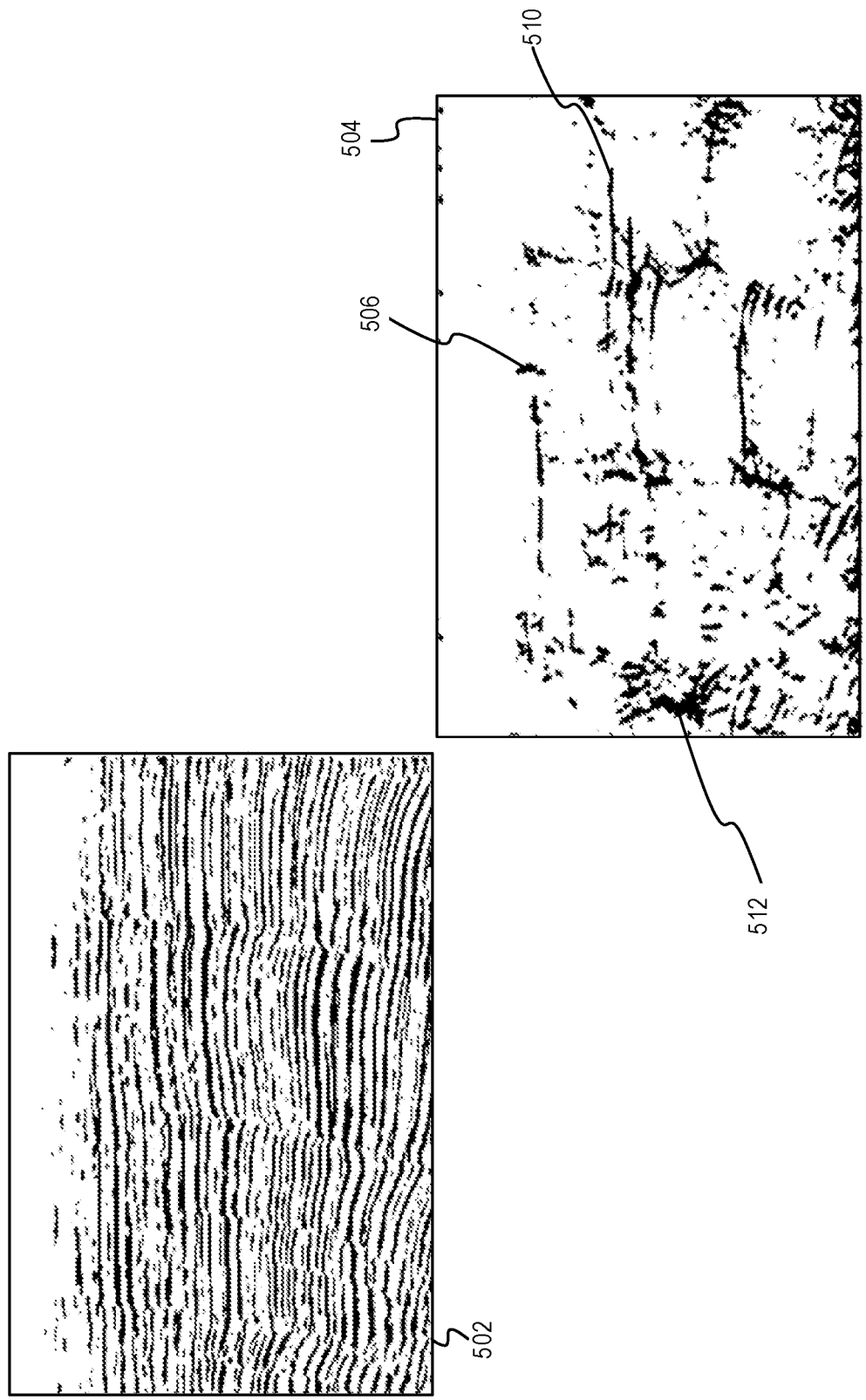
FIG. 5 depicts a seismic dataset and an edge-detected seismic dataset.

FIG. 5 depicts a seismic dataset and an edge-detected seismic dataset. With respect to FIG. 3, the seismic dataset 502 can be processed using an edge detection algorithm similar or the same as the one described for block 308 to produce an edge-detected seismic dataset 504. The edge-detected seismic datasets include indicators of various candidate discontinuities such as an indicator of a reflector 510, an indicator of a fault 512, and an indicator of a fracture 506. A trained neural network such as a trained deep neural network can use the edge-detected seismic dataset 504 to determine which of the indicators of candidate discontinuities are indicators of target discontinuities and which are indicators of non-target discontinuities.

Figure 6:
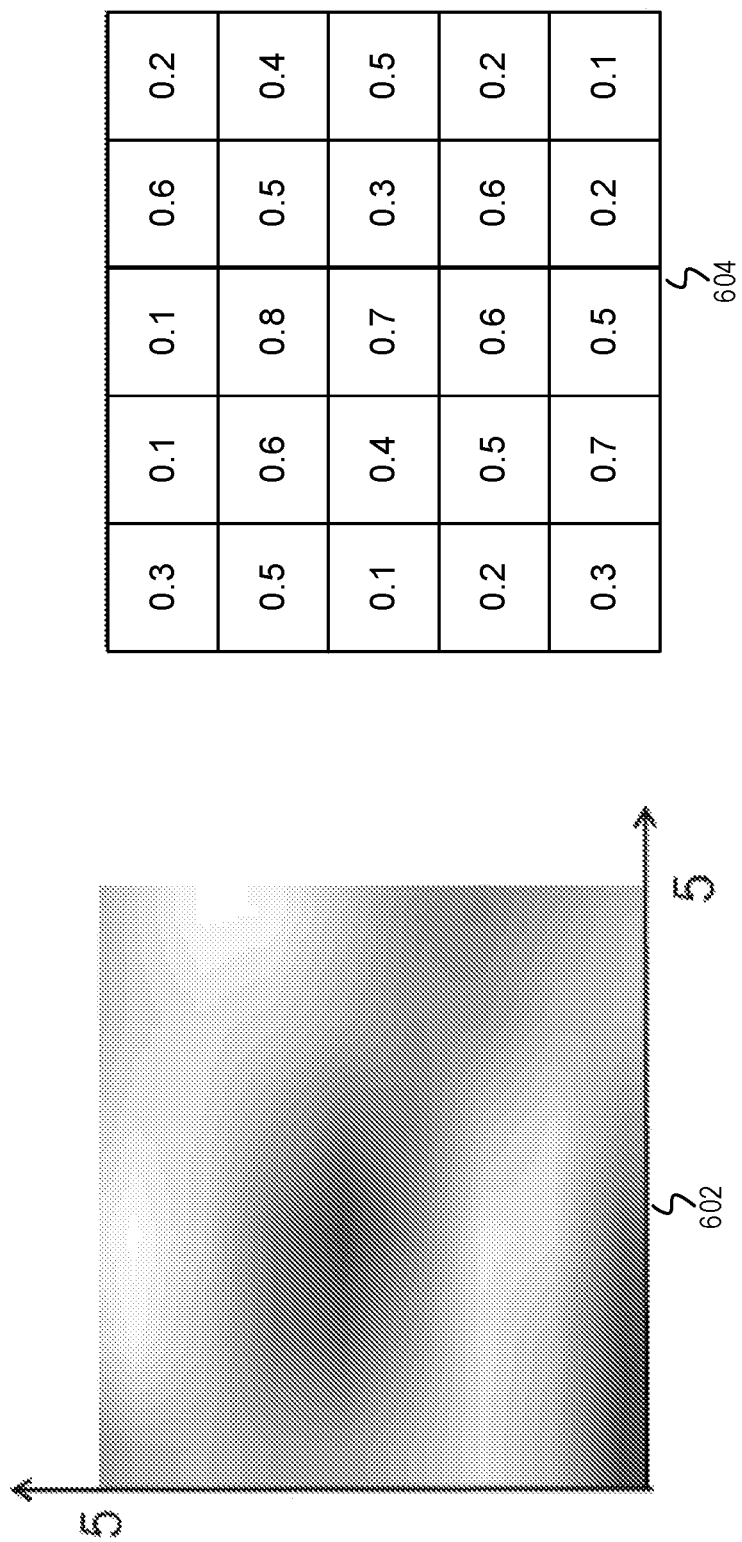
FIG. 6 depicts a 5×5 subsample of an edge-detected seismic dataset and corresponding fault likelihood.

FIG. 6 depicts a 5×5 subsample of an edge-detected seismic dataset and corresponding fault likelihood. Training and processing a large pixel image can have a significant numerical cost and raise classification challenges. One such challenge is that each fault segment is unique and it can be difficult to assign fault segments into a certain class. For example, with reference to FIG. 5, the edge-detected seismic dataset 504 can have pixel dimensions of 1301 pixels by 1889 pixels and a corresponding label array of equal size (e.g., each array value in the label array representing either "true" or "false" based on whether or not the corresponding pixel to the array value is detected as part of an indicator for a candidate discontinuity). The size of the edge detected seismic dataset 504 can incur a significant computational cost for neural network operations. To reduce this computational cost, the edge detected seismic dataset 504 can be partitioned into seismic subsamples such as the seismic subsample 602.

For example, with respect to FIG. 3, the seismic subsamples are generated using operations similar to or the same as those described in the flowchart 300. For each of the seismic subsamples, the brightness of each pixel can be represented as a corresponding value in the 5×5 subsample labeling array 604, wherein each element of the 5×5 subsample labeling array 604 has a value between zero and one to represent the likelihood of the element's corresponding pixel representing a part of a candidate discontinuity. The 5×5 subsample labeling array 604 can be assigned a subset label for the entire 5×5 subsample labeling array 604. For example, a binary classification operation can be used with a threshold value of 0.5. The result of the binary classification operation can be compared with the arithmetic mean of the 5×5 subsample labeling array 604 to determine if the seismic subsample is to be labeled as representing a part of a target discontinuity (e.g. a geological fault) or not. In the case that the arithmetic mean is greater than 0.5, the 5×5 pixel image 602 would be classified as representing a part of a geological fault. Otherwise, the 5×5 pixel image 602 would not be classified as representing a part of a geological fault.

Figure 7:
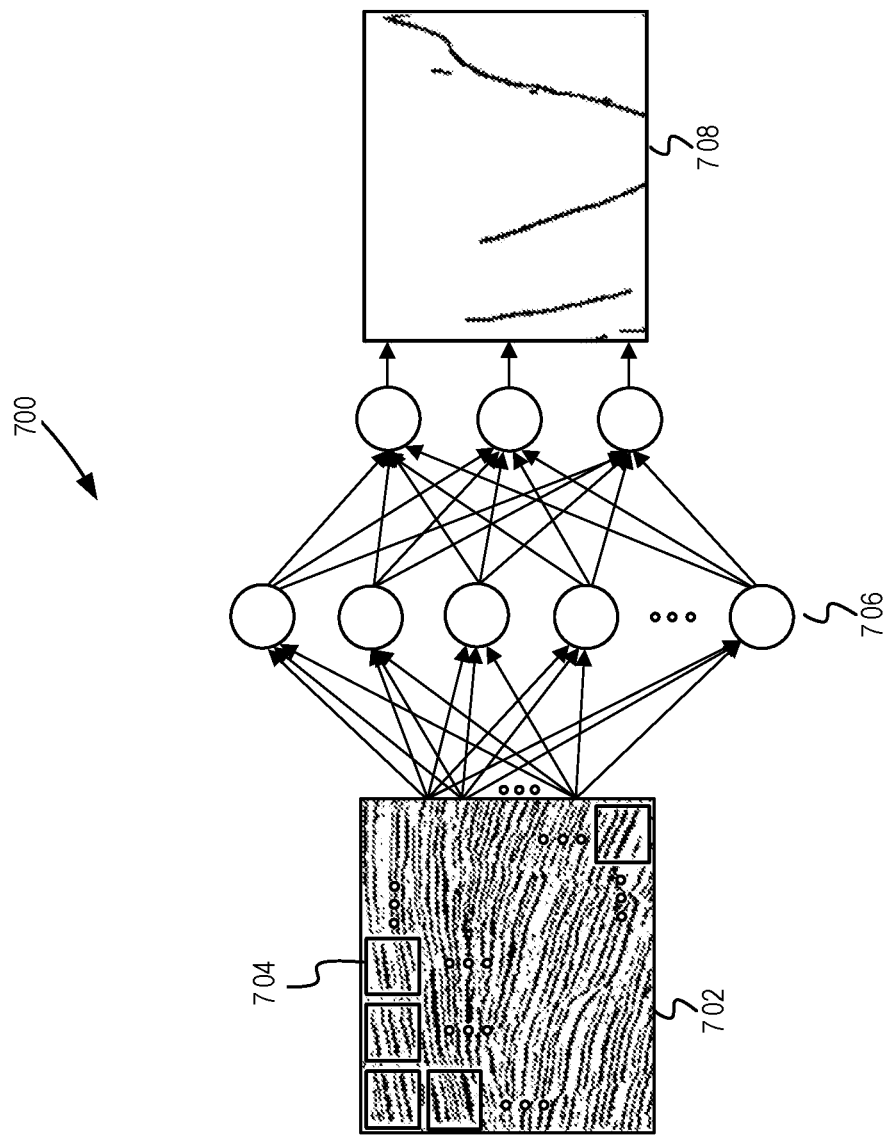
FIG. 7 depicts a neural network being applied onto a seismic dataset.

FIG. 7 depicts a neural network being applied onto a seismic dataset. FIG. 7 depicts an example convolutional neural network process 700. A seismic dataset such as the seismic dataset 702 can be partitioned into seismic subsamples 704. Each of the seismic subsamples 704 can be edge-detected and then quantified or classified with a value. In some embodiments, the value is based on whether a mean or weighted-mean of a fault-likelihood estimate for each element (e.g. pixel) in an edge-detected result of the seismic subsamples 704 is greater than or less than a threshold. In other embodiments, a value for each element in the seismic subsamples 704 can be used directly as a training or validation set for the neural network 706.

The neural network 706 can generate an interpreted seismic dataset 708, wherein target discontinuities such as fractures and faults can be identified. The seismic dataset 702 can be processed with an edge-detection algorithm before being processed by the neural network 706. The result of the edge-detection algorithm can be used as an input for the neural network 706 to generate the interpreted seismic dataset 708. In some embodiments, both the seismic dataset and its corresponding edge-detected seismic dataset can be used as inputs for the neural network 706 to generate the interpreted seismic dataset 708.

Figure 8:
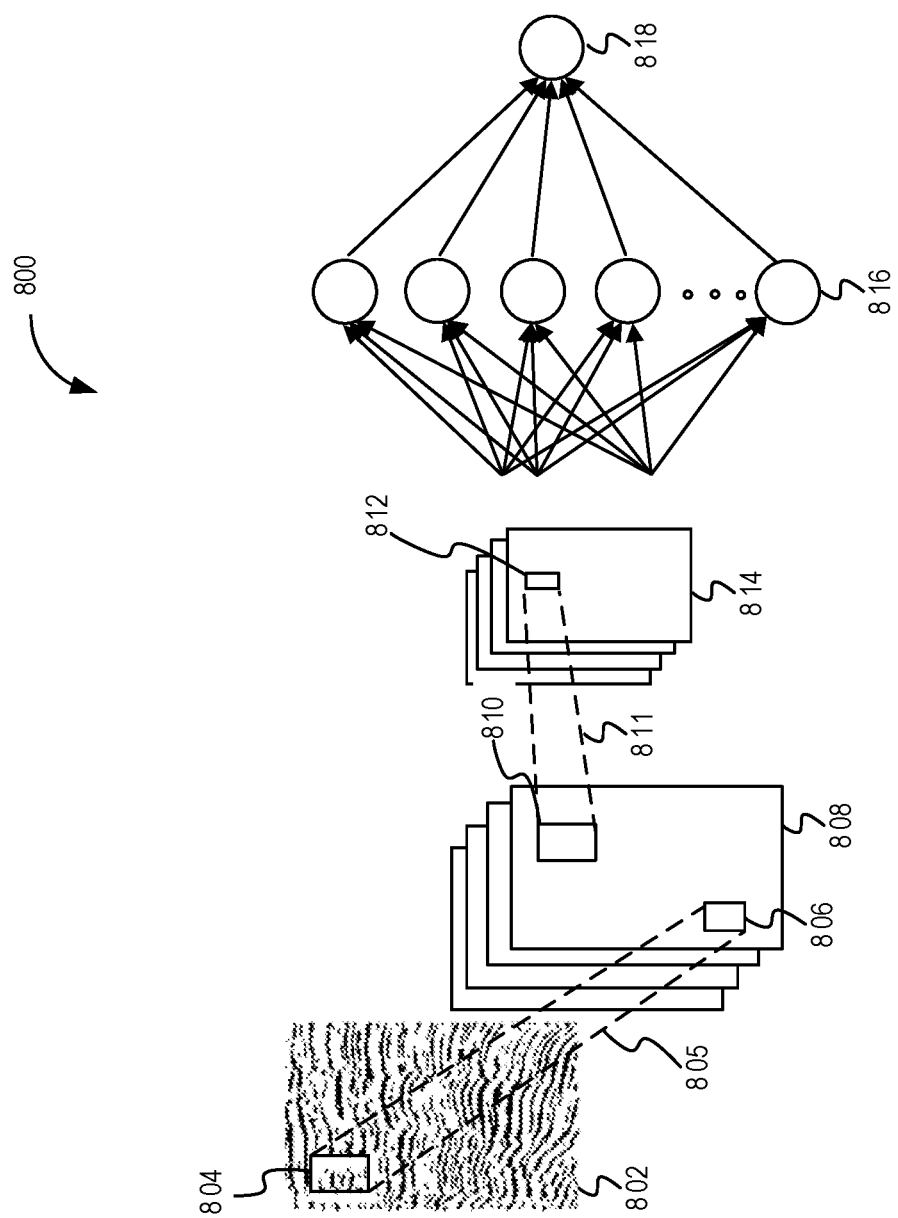
FIG. 8 depicts a convolutional neural network being applied onto a seismic dataset.

FIG. 8 depicts a convolutional neural network being applied onto a seismic dataset. FIG. 8 depicts an example convolutional neural network process 800. The convolutional neural network processes the seismic dataset 802 into the pooled convoluted datasets 808. In some embodiments, the seismic dataset 802 can be processed by an edge detection algorithm before being processed by the convolutional neural network. Each dataset of the pooled convoluted datasets 808 can be generated by a distinct convolution filter, wherein each convoluted dataset can be based on convoluted samples. For example, a subset array 804 can be convoluted by the convolution filter 805 into the convolution data subset 806, wherein the convolution data subset 806 is one of a series of data subsets that form a dataset of the pooled convoluted datasets 808. The pooled convoluted datasets 808 can then be downsampled into the pooled downsampled convolution datasets 814 and assigned an appropriate subsample labeling array. For example, a convolution data subset 810 can be reduced by downsampling filter 811 into the downsampled convolution subsample 812.

Once the pooled downsampled convolution datasets 814 have been generated, the pooled downsampled convolution datasets 814 can be processed by one or more layers of activation function units such as the ReLU layer 816. The output of the ReLU layer 816 can then be processed by a softmax units layer 818 to produce a reduced dimensional vector for labeling whether an indicator of a detected feature is an indicator of a target discontinuity. For example, with reference to FIG. 5, after appropriate training, the reduced dimensional vector can be used to label features in the edge-detected seismic dataset 504 by labeling the indicator of the reflector 510 as "not a fault" and labeling the indicator of the fault 512 as a "fault."

Figure 9:
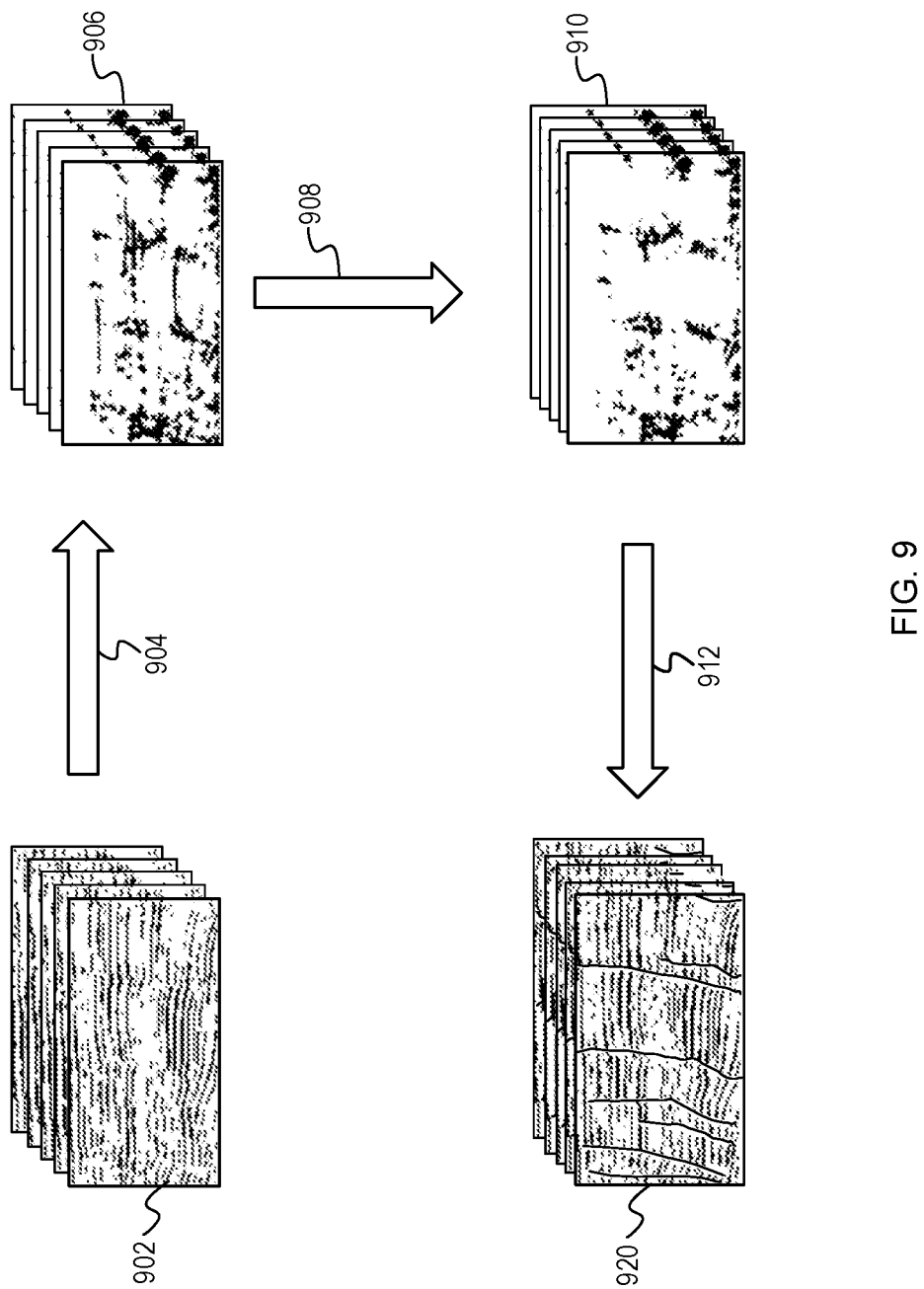
FIG. 9 depicts a workflow for an automated fault interpretation system.

FIG. 9 depicts a workflow for an automated fault interpretation system. After first acquiring seismic data such as a set of two-dimensional seismic datasets that can be stacked to form a three-dimensional seismic volume 902, an edge-detection method such as one incorporating a phase congruency operation can be used to process the two-dimensional seismic datasets to identify candidate discontinuities and determine indicators for the candidate discontinuities. With reference to FIG. 3, the edge detection method can be similar to or the same as the edge detection method described for block 308. Use of the edge detection algorithm 904 can generate the two-dimensional seismic datasets forming an edge-extracted volume 906. A convolutional neural network 908 can process the edge-extracted volume 906 to denoise the edge-extracted volume 906 into an interpreted seismic volume 910. With reference to FIG. 4, the convolutional neural network 908 can incorporate similar or the same operations as those described for blocks 404-416 to generate the interpreted seismic volume 910. In some embodiments, labeled datasets can include data assigned to pixels of a seismic dataset, wherein the data contain binary labels such as "fault" or "no fault" for each pixel of the seismic dataset.

Based on the values of the interpreted seismic volume 910, a data mapping/migration method 912 can be applied to combine the fractures/faults identified in the interpreted seismic volume 910 to generate a combined interpreted seismic volume 920. In some embodiments, data mapping can involve overlaying the output of the denoised volume onto the interpreted seismic volume. In some embodiments, intermediate processing can occur before or as a part of the data mapping to narrow, connect, extend, or otherwise clarify interpreted fault geometry in the denoised volume.

Figure 10:
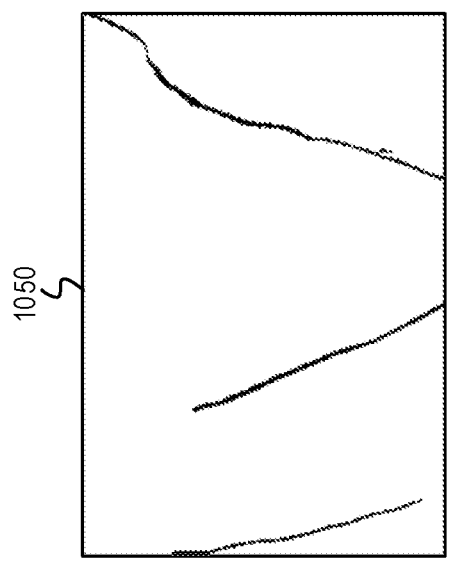
FIG. 10 depicts a comparison between an expert-labeled seismic dataset and an automated fault interpretation system-labeled seismic dataset.
Figure 10:
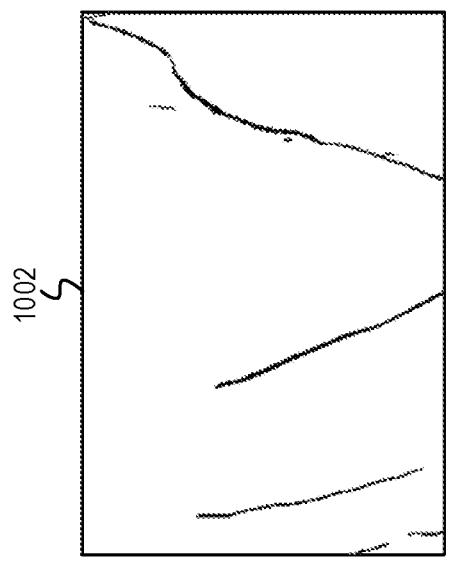

FIG. 10 depicts a comparison between an expert-labeled seismic dataset and an automated fault interpretation system-labeled seismic dataset. FIG. 10 depicts an expert-labeled dataset 1002, wherein each of the lines represent a labeled geological fracture or fault. After training the convolutional neural network of an automated fault interpretation system with the expert-labeled dataset 1002, an automated fault interpretation system-labeled dataset 1050 can provide similar results as the expert-labeled dataset 1002, wherein similarity can be defined as a less than 10% pixel difference between the two images.

EXAMPLE DRILLING SYSTEM

Figure 11:
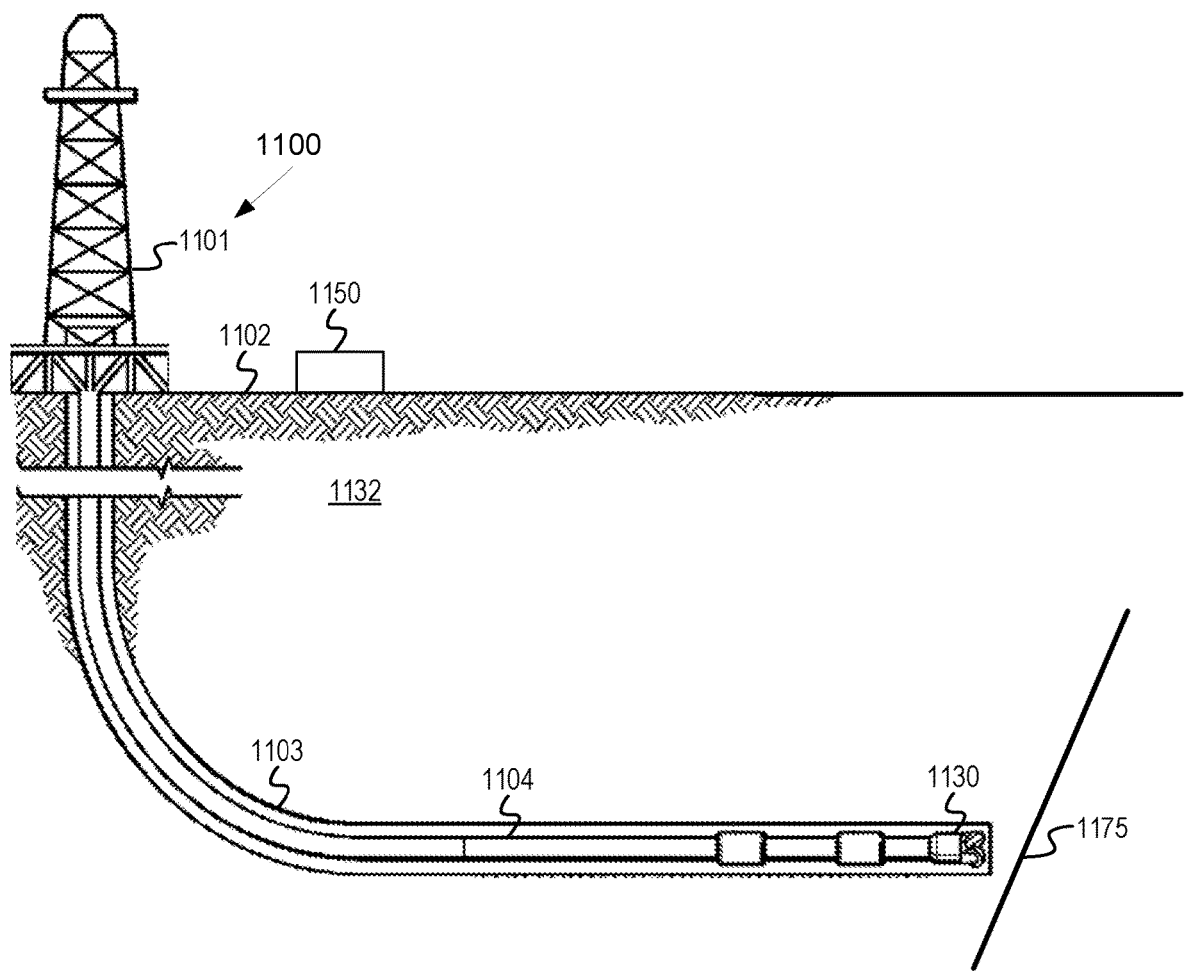
FIG. 11 depicts an example drilling system near a fault.

FIG. 11 depicts an example drilling system near a fault. FIG. 11 depicts a drilling system 1100. The drilling system 1100 includes a drilling rig 1101 located at the surface 1102 of a borehole 1103. The initial position of the borehole 1103 and various operational parameters (e.g. drilling speed, weight on bit, drilling fluid pump rate, drilling direction, drilling fluid composition) for drilling can be selected based on the results of the operations using an automated fault interpretation system (as described above). For example, with reference to FIG. 3, the position of the borehole 1103 can be selected to avoid faults identified using a set of indicators of discontinuities provided by the operations disclosed in blocks 304-344. The drill string 1104 can be operated for drilling the borehole 1103 through the subsurface formation 1132 with the bottomhole assembly (BHA).

The BHA includes a drill bit 1130 at the downhole end of the drill string 1104. The drill bit 1130 is in the vicinity of a fault 1175, wherein the position of fault 1175 is determined by an automated fault interpretation system. The BHA and the drill bit 1130 can be coupled to computing system 1150, which can operate the drill bit 1130 as well as receive data based on the sensors attached to the BHA. The drill bit 1130 can be operated to create the borehole 1103 by penetrating the surface 1102 and subsurface formation 1132. In some embodiments, a drilling plan can call for the drill bit 1130 to stop drilling when within a range of the fault 1175. By increasing the accuracy of the seismic interpretation, the drill bit 1130 can more safely and easily avoid penetrating through the fault 1175. For example, sensors on the BHA can transmit a signal to the computing system 1150 that the drill bit is near the fault 1175, and the computing system can stop the drill bit 1130.

EXAMPLE WELLBORE SYSTEM

Figure 12:
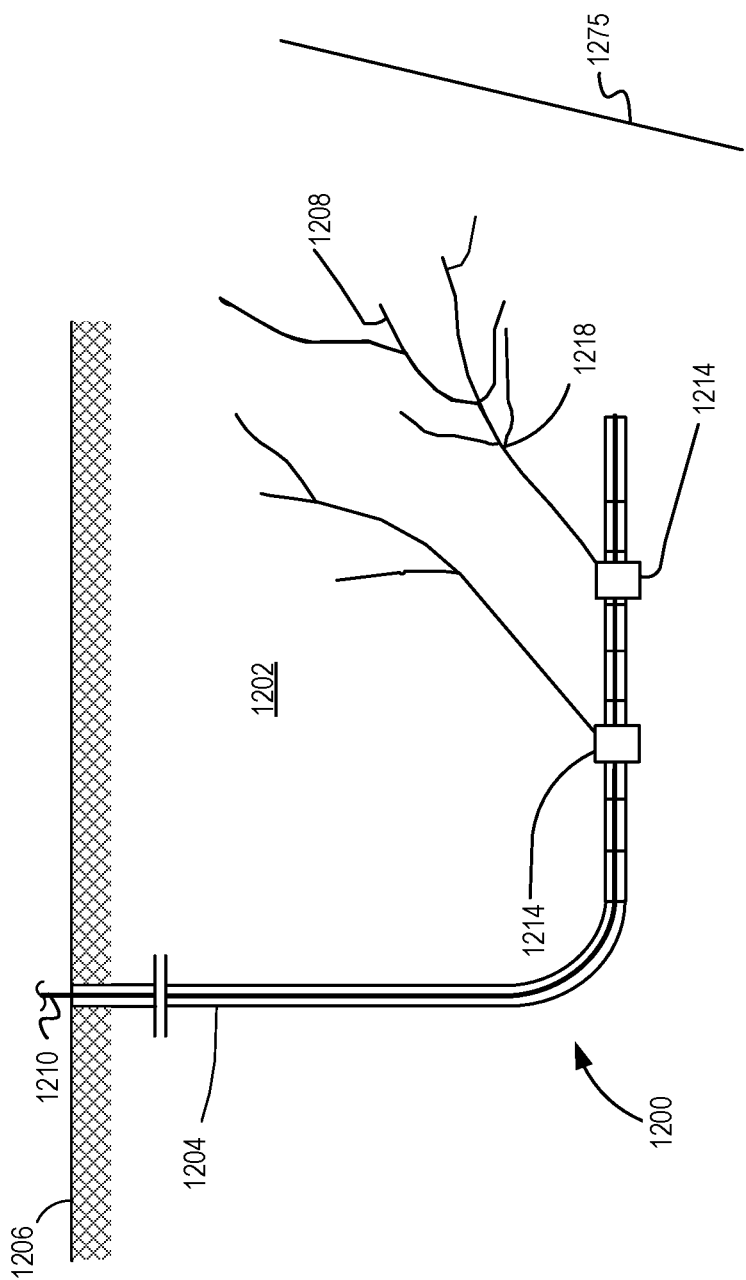
FIG. 12 depicts an example wellbore system near a fault.

FIG. 12 depicts an example wellbore system near a fault. A wellbore system 1200 depicted in FIG. 12 comprises a wellbore 1204 penetrating at least a portion of a subterranean formation 1202. The wellbore 1204 comprises one or more injection points 1214 where one or more fluids can be injected from the wellbore 1204 into the subterranean formation 1202. The subterranean formation 1202 can comprise pores initially saturated with reservoir fluids (e.g., oil, gas, and/or water). In certain embodiments, the wellbore system 1200 can be treated by the injection of a fracturing fluid, acid, or proppant at one or more injection points 1214 in the wellbore 1204. In certain embodiments, the one or more injection points 1214 can correspond to injection points 1214 in a casing of the wellbore 1204. When fluid enters the subterranean formation 1202 at the injection points 1214, one or more fractures 1218 can be opened. In certain embodiments, a diverting agent can enter the injection point 1214 and restrict the flow of further fluid. In some embodiments, the fracturing fluid can comprise a diverter.

As depicted in FIG. 12, the subterranean formation 1202 includes at least one fracture network 1208 connected to the wellbore 1204. The fracture network 1208 shown in FIG. 12 contains a number of junctions and fractures 1218. The number of junctions and fractures can vary drastically and/or unpredictably depending on the specific characteristics of the subterranean formation 1202. For example, the fracture network 1208 can comprise on the order of thousands of fractures 1218 to tens of thousands of fractures 1218. In some embodiments, these fractures can be within range of a fault 1275, wherein the position, orientation, and/or shape of the fault 1275 is determined using an automated fault interpretation system. For example, with reference to FIG. 3, using the operations disclosed in blocks 304-344, an indicator of the fault 1275 can be determined and used to find the position of the fault 1275.

In certain embodiments, an operational parameter can comprise one or more wellbore treatment controls and/or wellbore production controls. These operational parameters can be selected to avoid faults identified in the operations described above. In certain embodiments, the wellbore treatment controls can characterize a treatment operation for a wellbore 1204 penetrating at least a portion of a subterranean formation 1202. In certain embodiments, the operational parameters can include, but are not limited to an amount of acid, fracturing fluid or diverter pumped into the wellbore system 1200, a proppant concentration pumped into the wellbore system 1200, a proppant size used during pumping into the wellbore system 1200, a wellbore pressure at the injection points 1214, a fluid or diverter flow rate at the wellbore inlet 1210, the pressure at the wellbore inlet 1210, a duration of a acidizing/stimulation treatment, a diverter particle diameter, and any combination thereof. In certain embodiments, in response to calculations determining that a fracturing or acidization operation may damage or perforate the fault 1275, an operational parameter can be altered to prevent the damage/perforation from occurring. For example, a computer system can determine that a set of operational parameters will result in damaging the fault 1275, and, in response, reduce a fluid flow rate at the surface 1206.

In certain embodiments, the one or more operational parameters can be changed in response to real-time measurements. In some embodiments, real-time measurements can comprise pressure measurements, flow rate measurements, and seismic measurements. In certain embodiments, real-time measurements can be obtained from one or more wellsite data sources or sensors in acoustic communication with the subterranean formation 1202. Wellsite data sources can include, but are not limited to, flow sensors, pressure sensors, thermocouples, and any other suitable measurement apparatus. In certain embodiments, wellsite data sources can be positioned at the surface, on a downhole tool, in the wellbore 1204 or in fractures 1218. Pressure measurements can, for example, be obtained from a pressure sensor at a surface of the wellbore 1204.

EXAMPLE COMPUTING SYSTEM

Figure 13:
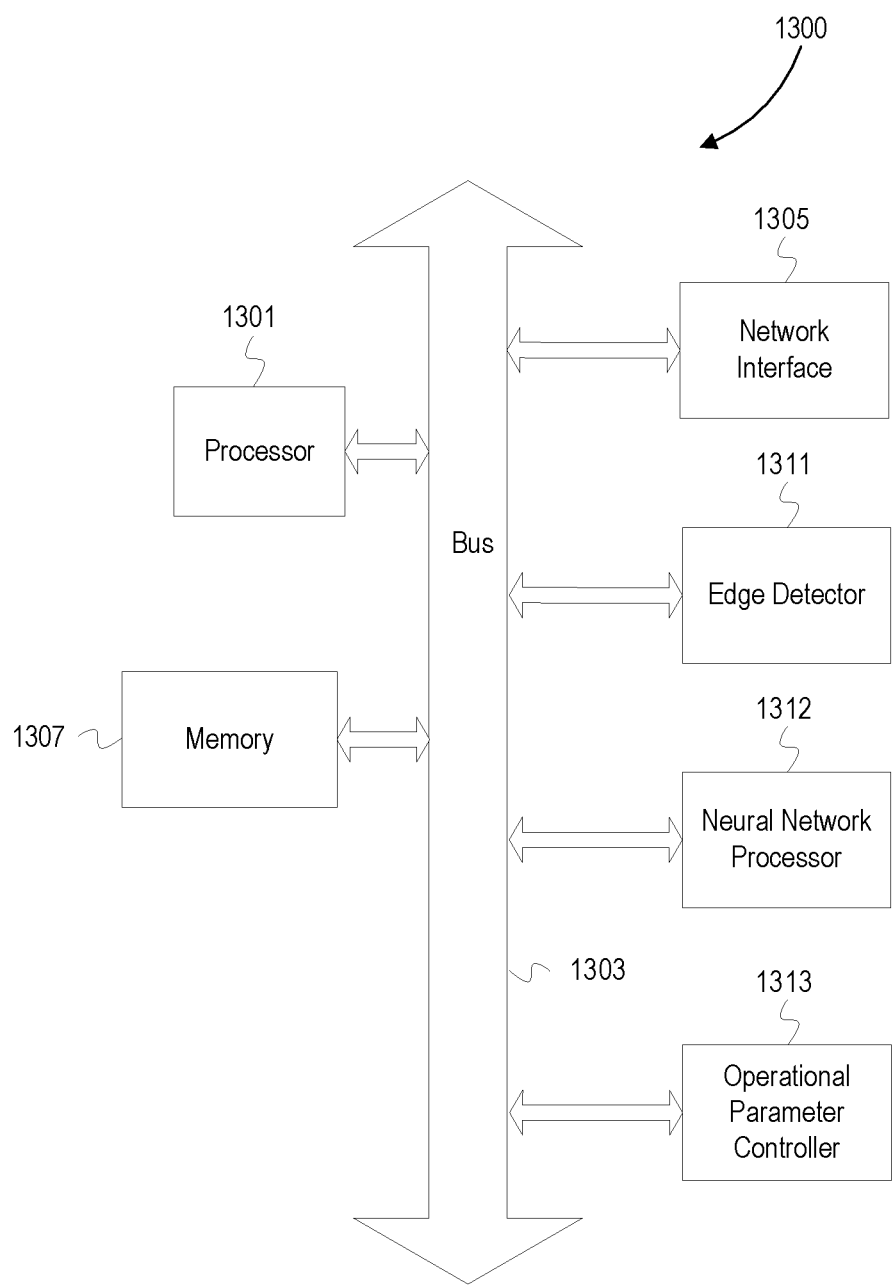
FIG. 13 depicts an example computer system.

FIG. 13 depicts an example computer system. A computer device 1300 includes a processor 1301 (possibly including multiple processors, multiple cores, multiple nodes, and/or implementing multi-threading, etc.). The computer device 1300 includes a memory 1307. The memory 1307 can be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer device 1300 also includes a bus 1303 (e.g., PCI, ISA, PCI-Express, HyperTransport® bus, InfiniBand® bus, NuBus, etc.) and a network interface 1305 (e.g., a Fiber Channel interface, an Ethernet interface, an internet small computer system interface, SONET interface, wireless interface, etc.).

In some embodiments, the computer device 1300 includes an edge detector 1311. The edge detector 1311 can perform one or more operations for detecting the candidate discontinuities of seismic dataset, including operations to apply a phase congruency operation. The neural network processor 1312 can perform one or more operations for classifying and filtering a seismic dataset, including operations to apply a convolutional neural network to classify indicators of candidate discontinuities as indicators of faults/fractures and removing indicators of candidate discontinuities that are not indicators of faults/fractures from a labeled subset of indicators of discontinuities. The operational parameter controller 1313 can perform one or more operations for controlling a drilling system or a wellbore system, including controlling a drill bit or fluid pump rate. Any one of the previously described functionalities can be partially (or entirely) implemented in hardware and/or on the processor 1301. For example, the functionality can be implemented with an application specific integrated circuit, in logic implemented in the processor 1301, in a co-processor on a peripheral device or card, etc. Further, realizations can include fewer or additional components not illustrated in FIG. 13 (e.g., video cards, audio cards, additional network interfaces, peripheral devices, etc.). The processor 1301 and the network interface 1305 are coupled to the bus 1303. Although illustrated as being coupled to the bus 1303, the memory 1307 can be coupled to the processor 1301. The computer device 1300 can be integrated into component(s) of the drill pipe downhole and/or be a separate device at the surface that is communicatively coupled to the BHA downhole for controlling and processing signals (as described herein).

As will be appreciated, aspects of the disclosure can be embodied as a system, method or program code/instructions stored in one or more machine-readable media. Accordingly, aspects can take the form of hardware, software (including firmware, resident software, micro-code, etc.), or a combination of software and hardware aspects that can all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) can be utilized. The machine-readable medium can be a machine-readable signal medium or a machine-readable storage medium. A machine-readable storage medium can be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium can be any tangible medium that can contain, or store a program for use by or in connection with an instruction execution system, apparatus, or device. A machine-readable storage medium is not a machine-readable signal medium.

A machine-readable signal medium can include a propagated data signal with machine readable program code embodied therein, for example, in baseband or as part of a carrier wave. Such a propagated signal can take any of a variety of forms, including, but not limited to, electromagnetic, optical, or any suitable combination thereof. A machine-readable signal medium can be any machine readable medium that is not a machine-readable storage medium and that can communicate, propagate, or transport a program for use by or in connection with an instruction execution system, apparatus, or device.

Program code embodied on a machine-readable medium can be transmitted using any appropriate medium, including but not limited to wireless, wireline, optical fiber cable, RF, etc., or any suitable combination of the foregoing.

Computer program code for carrying out operations for aspects of the disclosure can be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code can execute entirely on a stand-alone machine, can execute in a distributed manner across multiple machines, and can execute on one machine while providing results and or accepting input on another machine.

The program code/instructions can also be stored in a machine-readable medium that can direct a machine to function in a particular manner, such that the instructions stored in the machine-readable medium produce an article of manufacture including instructions which implement the function/act specified in the flowchart and/or block diagram block or blocks.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

EXAMPLE EMBODIMENTS

Example embodiments include the following:

Embodiment 1: A method for determining a position of a geological feature in a formation comprising: acquiring a seismic dataset, wherein the seismic dataset is based on signals of one or more seismic sensors to receive waves from within the formation; determining a set of indicators of candidate discontinuities in the formation based on the seismic dataset; labeling a subset of the set of indicators of candidate discontinuities using a neural network with a label based on the set of indicators of candidate discontinuities, wherein the label distinguishes an indicator of a candidate discontinuity between being an indicator of a target discontinuity or being an indicator of a non-target discontinuity; and determining the position of the geological feature in the formation, wherein the geological feature in the formation is associated with at least one target discontinuity based on the subset of the set of indicators of candidate discontinuities.

Embodiment 2: The method of Embodiment 1, wherein the determining the set of indicators of candidate discontinuities based on the seismic dataset comprises applying a phase congruency operation on the seismic dataset.

Embodiment 3: The method of Embodiments 1 or 2, wherein labeling the subset of the set of indicators of candidate discontinuities comprises: generating a convoluted dataset based on one or more convolution layers of the neural network, wherein the one or more convolution layers are applied to at least one of the seismic dataset and the set of indicators of candidate discontinuities; and labeling the subset of the set of indicators of candidate discontinuities using one or more rectified linear units layers of the neural network based on the convoluted dataset.

Embodiment 4: The method of any of Embodiments 1-3, wherein determining the set of indicators of candidate discontinuities comprises partitioning the seismic dataset into seismic subsamples.

Embodiment 5: The method of any of Embodiments 1-4, wherein labeling the subset of the set of indicators of candidate discontinuities comprises performing a binary classification operation using the neural network.

Embodiment 6: The method of any of Embodiments 1-5, wherein the geological feature is at least one of a fracture and a geological fault.

Embodiment 7: The method of any of Embodiments 1-6, wherein labeling the subset of the set of indicators of candidate discontinuities comprises distinguishing an indicator of a candidate discontinuity between being an indicator of a target discontinuity or an indicator of a signal reflector from the formation.

Embodiment 8: One or more non-transitory machine-readable media comprising program code for determining a position of a geological feature in a formation, the program code to: acquire a seismic dataset, wherein the seismic dataset is based on signals of one or more seismic sensors to receive waves from within a formation; determine a set of indicators of candidate discontinuities in the formation based on the seismic dataset; label a subset of the set of indicators of candidate discontinuities using a neural network with a label based on the set of indicators of candidate discontinuities, wherein the label distinguishes an indicator of a candidate discontinuity between being an indicator of a target discontinuity or being an indicator of a non-target discontinuity; and determine the position of the geological feature in the formation, wherein the geological feature in the formation is associated with at least one target discontinuity based on the subset of the set of indicators of candidate discontinuities.

Embodiment 9: The machine-readable media of Embodiment 8, wherein the program code to determine the set of indicators of candidate discontinuities based on the seismic dataset comprises program code to apply a phase congruency operation on the seismic dataset.

Embodiment 10: The machine-readable media of Embodiments 8 or 9, wherein the program code to label the subset of the set of indicators of candidate discontinuities comprises program code to: generate a convoluted dataset based on one or more convolution layers of the neural network, wherein the one or more convolution layers are applied to at least one of the seismic dataset and the set of indicators of candidate discontinuities; and label the subset of the set of indicators of candidate discontinuities using one or more rectified linear units layers of the neural network based on the convoluted dataset.

Embodiment 11: The machine-readable media of any of Embodiments 8-10, wherein the program code to determine the set of indicators of candidate discontinuities comprises program code to partition the seismic dataset into seismic subsamples.

Embodiment 12: The machine-readable media of any of Embodiments 8-11, wherein the program code to label the subset of the set of indicators of candidate discontinuities comprises program code to perform a binary classification operation using the neural network.

Embodiment 13: The machine-readable media of any of Embodiments 8-12, wherein the geological feature is at least one of a fracture and a geological fault.

Embodiment 14: The machine-readable media of any of Embodiments 8-13, wherein the program code to label the subset of the set of indicators of candidate discontinuities comprises program code to distinguish an indicator of a candidate discontinuity between being an indicator of a target discontinuity or an indicator of a signal reflector from the formation.

Embodiment 15: An apparatus comprising: one or more seismic sensors to receive waves from within a formation; a processor; and a machine-readable medium having program code executable by the processor to cause the apparatus to, acquire a seismic dataset, wherein the seismic dataset is based on signals of the one or more seismic sensors, determine a set of indicators of candidate discontinuities in the formation based on the seismic dataset, label a subset of the set of indicators of candidate discontinuities using a neural network with a label based on the set of indicators of candidate discontinuities, wherein the label distinguishes an indicator of a candidate discontinuity between being an indicator of a target discontinuity or being an indicator of a non-target discontinuity, and determine a position of a geological feature in the formation, wherein the geological feature in the formation is associated with at least one target discontinuity based on the subset of the set of indicators of candidate discontinuities.

Embodiment 16: The apparatus of Embodiment 15, wherein the program code to determine the set of indicators of candidate discontinuities based on the seismic dataset comprises program code to apply a phase congruency operation on the seismic dataset.

Embodiment 17: The apparatus of Embodiments 15 or 16, wherein the program code to label the subset of the set of indicators of candidate discontinuities comprises program code to: generate a convoluted dataset based on one or more convolution layers of the neural network, wherein the one or more convolution layers are applied to at least one of the seismic dataset and the set of indicators of candidate discontinuities; and label the subset of the set of indicators of candidate discontinuities using one or more rectified linear units layers of the neural network based on the convoluted dataset.

Embodiment 18: The apparatus of any of Embodiments 15-17, wherein the program code to determine the set of indicators of candidate discontinuities comprises program code to partition the seismic dataset into seismic subsamples.

Embodiment 19: The apparatus of any of Embodiments 15-18, wherein the program code to label the subset of the set of indicators of candidate discontinuities comprises program code to perform a binary classification operation using the neural network.

Embodiment 20: The apparatus of any of Embodiments 15-19, wherein the geological feature is at least one of a fracture and a geological fault.

What is claimed is:

1. A method for determining a position of a geological feature in a formation comprising:
   receiving, with one or more seismic sensors, signals from within the formation, wherein the signals are based on seismic waves generated by a seismic source;
   determining a seismic dataset, wherein the seismic dataset is based on the signals;
   determining, with an edge detector, a set of indicators of candidate discontinuities in the formation based on the seismic dataset;
   labeling, with a neural network processor, a subset of the set of indicators of candidate discontinuities using a neural network with a label based on the set of indicators of candidate discontinuities, wherein the label distinguishes an indicator of a candidate discontinuity between being an indicator of a target discontinuity or being an indicator of a non-target discontinuity; and
   determining the position of the geological feature in the formation, wherein the geological feature in the formation is associated with at least one target discontinuity based on the subset of the set of indicators of candidate discontinuities.

2. The method of claim 1, wherein the determining the set of indicators of candidate discontinuities based on the seismic dataset comprises applying a phase congruency operation on the seismic dataset.

3. The method of claim 1, wherein labeling the subset of the set of indicators of candidate discontinuities comprises:
   generating a convoluted dataset based on one or more convolution layers of the neural network, wherein the one or more convolution layers are applied to at least one of the seismic dataset and the set of indicators of candidate discontinuities; and
   labeling the subset of the set of indicators of candidate discontinuities using one or more rectified linear units layers of the neural network based on the convoluted dataset.

4. The method of claim 1, wherein determining the set of indicators of candidate discontinuities comprises partitioning the seismic dataset into seismic subsamples.

5. The method of claim 1, wherein labeling the subset of the set of indicators of candidate discontinuities comprises performing a binary classification operation using the neural network.

6. The method of claim 1, wherein the geological feature is at least one of a fracture and a geological fault.

7. The method of claim 6, wherein labeling the subset of the set of indicators of candidate discontinuities comprises distinguishing an indicator of a candidate discontinuity between being an indicator of a target discontinuity or an indicator of a signal reflector from the formation.

8. One or more non-transitory machine-readable media comprising program code for determining a position of a geological feature in a formation, the program code to:
   receive, with one or more seismic sensors, signals from within the formation, wherein the signals are based on seismic waves generated by a seismic source;
   determine a seismic dataset, wherein the seismic dataset is based on the signals;
   determine, with an edge detector, a set of indicators of candidate discontinuities in the formation based on the seismic dataset;
   label, with a neural network processor, a subset of the set of indicators of candidate discontinuities using a neural network with a label based on the set of indicators of candidate discontinuities, wherein the label distinguishes an indicator of a candidate discontinuity between being an indicator of a target discontinuity or being an indicator of a non-target discontinuity; and
   determine the position of the geological feature in the formation, wherein the geological feature in the formation is associated with at least one target discontinuity based on the subset of the set of indicators of candidate discontinuities.

9. The machine-readable media of claim 8, wherein the program code to determine the set of indicators of candidate discontinuities based on the seismic dataset comprises program code to apply a phase congruency operation on the seismic dataset.

10. The machine-readable media of claim 8, wherein the program code to label the subset of the set of indicators of candidate discontinuities comprises program code to:
    generate a convoluted dataset based on one or more convolution layers of the neural network, wherein the one or more convolution layers are applied to at least one of the seismic dataset and the set of indicators of candidate discontinuities; and
    label the subset of the set of indicators of candidate discontinuities using one or more rectified linear units layers of the neural network based on the convoluted dataset.

11. The machine-readable media of claim 8, wherein the program code to determine the set of indicators of candidate discontinuities comprises program code to partition the seismic dataset into seismic subsamples.

12. The machine-readable media of claim 8, wherein the program code to label the subset of the set of indicators of candidate discontinuities comprises program code to perform a binary classification operation using the neural network.

13. The machine-readable media of claim 8, wherein the geological feature is at least one of a fracture and a geological fault.

14. The machine-readable media of claim 8, wherein the program code to label the subset of the set of indicators of candidate discontinuities comprises program code to distinguish an indicator of a candidate discontinuity between being an indicator of a target discontinuity or an indicator of a signal reflector from the formation.

15. An apparatus comprising:
    one or more seismic sensors;
    a processor; and
    a machine-readable medium having program code executable by the processor to cause the apparatus to,
      receive, with the one or more seismic sensors, signals from within a formation, wherein the signals are based on seismic waves generated by a seismic source
      determine a seismic dataset, wherein the seismic dataset is based on the signals,
      determine, with an edge detector, a set of indicators of candidate discontinuities in the formation based on the seismic dataset,
      label, with a neural network processor, a subset of the set of indicators of candidate discontinuities using a neural network with a label based on the set of indicators of candidate discontinuities, wherein the label distinguishes an indicator of a candidate discontinuity between being an indicator of a target discontinuity or being an indicator of a non-target discontinuity, and
      determine a position of a geological feature in the formation, wherein the geological feature in the formation is associated with at least one target discontinuity based on the subset of the set of indicators of candidate discontinuities.

16. The apparatus of claim 15, wherein the program code to determine the set of indicators of candidate discontinuities based on the seismic dataset comprises program code to apply a phase congruency operation on the seismic dataset.

17. The apparatus of claim 15, wherein the program code to label the subset of the set of indicators of candidate discontinuities comprises program code to:
   generate a convoluted dataset based on one or more convolution layers of the neural network, wherein the one or more convolution layers are applied to at least one of the seismic dataset and the set of indicators of candidate discontinuities; and
   label the subset of the set of indicators of candidate discontinuities using one or more rectified linear units layers of the neural network based on the convoluted dataset.

18. The apparatus of claim 15, wherein the program code to determine the set of indicators of candidate discontinuities comprises program code to partition the seismic dataset into seismic subsamples.

19. The apparatus of claim 15, wherein the program code to label the subset of the set of indicators of candidate discontinuities comprises program code to perform a binary classification operation using the neural network.

20. The apparatus of claim 15, wherein the geological feature is at least one of a fracture and a geological fault.

* * * * *